United States Patent [19]

Lin

[11] Patent Number: 4,824,588

[45] Date of Patent: Apr. 25, 1989

[54] DEICING AGENT

[75] Inventor: Stephen Y. Lin, Wausau, Wis.

[73] Assignee: Reed Lignin Inc., Rothschild, Wis.

[21] Appl. No.: 134,791

[22] Filed: Dec. 18, 1987

[51] Int. Cl.$^4$ .............................................. C09K 3/18
[52] U.S. Cl. ...................................... 252/70; 252/396; 422/7
[58] Field of Search ........................ 252/70, 396; 422/7

[56] References Cited

U.S. PATENT DOCUMENTS 3,219,582 11/1965 Gaertner .............................. 252/396
4,668,416 5/1987 Neal ...................................... 252/70

FOREIGN PATENT DOCUMENTS 51-12310 4/1976 Japan .

OTHER PUBLICATIONS

Report entitled "Sprinkle Lightly—Salt and Alternatives for Highway De-Icing", Canadian Government Report No. MSP-84-01, published by the Ontario Ministry of Transportation and Communications, 7-1984.

*Primary Examiner*—Robert A. Wax
*Attorney, Agent, or Firm*—Andrus, Sceales, Starke & Sawall

[57] ABSTRACT

A deicing composition comprising saccharinic acid, lignosulfonate and an alkali metal or alkaline earth metal chloride selected from among sodium chloride, magnesium chloride, calcium chloride and mixtures thereof, the ratio of said saccharinic acid, lignosulfonate and chloride being from about 0.05:0.95:15 to about 0.75:2.25:1. The composition has a pH value of from about 5.0 to 9.5. The saccharinic acid contemplated for use in the composition is isosaccharinic or metasaccharinic acid, or mixtures thereof. The saccharinic acid may be conveniently derived from the alkali treatment of monosaccharides and oligosaccharides inherently contained in spent sulfite liquor by heating at a temperature of 50° C. to 150° C., preferably at 80° C. to 100° C.

15 Claims, 1 Drawing Sheet

DEICING AGENT

BACKGROUND OF THE INVENTION

This invention relates to deicing agents, and more particularly, it is related to a deicing composition comprising an alkali metal or alkaline earth metal chloride, saccharinic acid and lignosulfonate.

In winter months the presence of snow and ice on roads, sidewalks, bridges, airport runways and highways presents serious safety hazards and operational difficulties that hinder everyday activities such as driving, walking, flying and so on. Over the years, many methods have been used in the colder regions of the world to remove or destroy ice or snow. The ice-removal process (or deicing) includes certain techniques ranging from simple approaches such as shoveling or plowing, to heating by means of buried heating elements or by the direct application of heat, to chemical methods i.e. the use of deicing chemicals such as sodium chloride and calcium chloride. For an effective treatment of large surface areas such as roads and runways, a combination of mechanical deicing (snowplowing) and chemical deicing (salt and sand) is normally employed.

The most commonly used chemical deicer for highways is rock salt i.e. sodium chloride. Rock salt is inexpensive and readily available in large quantities. Calcium chloride and magnesium chloride are sometimes used for their higher deicing power. However, the calcium and magnesium salts are substantially more expensive and magnesium chloride is more corrosive than rock salt, thus limiting their use. At the present time, it is estimated that the usage of rock salt in the U.S.A. alone amounts to 9 to 10 million tons per year for deicing applications.

Several disadvantages of using deicing salts have been experienced. These are for example salt contamination of ground water, damage to vegetation, and corrosion of vehicles and highway appurtenances. Chlorides dissolve readily in water and are known to accelerate the corrosion rate of metals. In a report entitled "Sprinkle Lightly - Salt And Alternatives For Highway De-Icing", Canadian Government Report No. MSP-4-01, published by the Ontario Ministry of Transportation and Communications, it was found that in the Toronto area 50% of the corrosion occurring on auto body steel was due to salt use during the winter months. Deicing salt also contributes to the corrosion of reinforcing steel in concrete bridge decks and substructures which would otherwise be protected by the alkaline environment in concrete.

In recent years, increased attention has been focused on alternative methods of deicing roadways. There are now available various ways of reducing the corrosive effects of salt. One alternative to salt is calcium magnesium acetate (CMA). Tests so far suggest that CMA is less polluting and less corrosive than salt. Some chemicals used in place of alkali metal or alkaline earth metal chlorides are mixtures of urea and calcium formate, metal sulfates, phosphates, nitrates, long-chain amines and so on. None of these chemicals have gained widespread commercialization due to their high cost, environmental damage and inadequate performance.

The use of lignosulfonate as a low cost material for reducing the corrosiveness of salt is known. In Japanese Patent No. 7612310 (April, 1976), a three-part mixture of calcium chloride, calcium hydroxide and calcium lignosulfonate was disclosed for use as a deicing chemical of reduced corrosiveness. A 1 to 3% (dry weight) mixture of calcium lignosulfonate to calcium chloride (lignosulfonate:calcium chloride ratio up to 1:35) was tested, with practically no corrosion inhibition. However, when both calcium lignosulfonate and calcium chloride were mixed with calcium hydroxide, a greater rust-preventing effect was demonstrated and the Japanese patent is specifically directed to the combination that contains both lignosulfonate and calcium hydroxide in combination with calcium chloride. Each of the combinations disclosed in the Japanese patent contains 1–5% calcium lignosulfonate and at least as much calcium hydroxide and has a pH of 10 or higher. U.S. Pat. No. 4,668,416 (May, 1987) teaches the use of a deicing mixture that comprises spent sulfite liquor and a metal chloride salt selected from the group of alkali metal and alkaline earth metal chlorides in amounts such that the ratio (dry weight) of the lignosulfonate content of the spent sulfite liquor to metal chloride salt is from about 1:25 to about 15:1, with the mixture having a pH of from about 4.5 to about 8.5. In essence, the distinctions of U.S. Pat. No. 4,668,416 from the disclosure taught by Japanese Patent No. 7612310 are:

(1) The mixture of the U.S. '416 patent contains a larger quantity of calcium lignosulfonate; the ratio of calcium lignosulfonate and calcium chloride being at 1:25 to 15:1 (in contrast to the Japanese patent's ratio of 1:35).

(2) The U.S. '416 patent specifies a pH of the mixture at 4.5 to 8.5, whereas the Japanese patent specifies a pH of about 10 or above.

(3) The composition of the U.S. '416 patent contains no calcium hydroxide which is a constituent of the Japanese patent.

The "spent sulfite liquor" utilized in U.S. Pat. No. 4,668,416 was defined as the liquor obtained from the sulfite pulping process (that is without substantial removal of other solids), or spent sulfite liquors which have been subjected to fermentation to convert at least a portion of the carbohydrates to alcohol or to protein by-products (fermented spent sulfite liquor) or spent sulfite liquors which have been subjected to alkali oxidation to produce vanillin (vanillin raffinate).

Chemical composition of the dry substance in a typical spent sulfite liquor from pulping of softwood or hardwood is approximately as follows (% by weight):

|  | Softwood | Hardwood |
| --- | --- | --- |
| Lignosulfonic acid | 55 | 42 |
| Hexose sugars | 14 | 5 |
| Pentose sugars | 6 | 20 |
| Non-cellulose carbohydrates | 8 | 11 |
| Acetic and formic acids | 4 | 9 |
| Resin and extractives | 2 | 1 |
| Ash | 10 | 10 |

Thus, as seen from the above analysis a little more than half the organic matter originates from the lignin in the softwood spent sulfite liquor and slightly less than half in the hardwood liquor. The monosaccharide content of the two liquors are quite different. As shown above, the major portion of sugars in the softwood liquor are hexoses, whereas pentoses (mostly xylose) dominate among the hardwood monosaccharides.

In the industrial fermentation process of spent sulfite liquor, lignosulfonate remains practically unchanged and most of the simple sugars are consumed to form yeast. In vanillin production wherein spent sulfite liquor is subjected to a treatment with alkali and air at elevated temperature, lignosulfonate is extensively desulfonated and degraded, and sugars are destroyed, leading to the formation of volatile acids. According to analyses, the vanillin raffinate (residue from a vanillin cook) contains about 3.8% oxalic acid, 3% acetic acid and 6.3% formic acid. Neither the fermentation nor vanillin process produces saccharinic acids from the monosaccharides in spent sulfite liquors.

In short, the prior art "spent sulfite liquors" or "lignosulfonates" are certain lignosulfonates, either relatively pure, or contaminated with various amounts of sugars, low molecular weight carboxylic acids and ash (inorganic salts), dependng on treatments that a spent sulfite liquor has been subjected to. Although these prior art lignosulfonates and spent sulfite liquors exhibit a certain degree of corrosion inhibiting ability when used in combination with deicing salts, their effectiveness is less than desirable.

It is an object of the invention to provide an improved additive to deicing salts to reduce corrosion.

It is a further object of the invention to provide a deicing agent of enhanced penetration power into the ice structure.

It is an additional object of the invention to provide a low cost deicing composition from spent sulfite liquor for removal of snow and ice from roadways, bridges and runways.

SUMMARY OF THE INVENTION

It has been unexpectedly discovered that the above and other objects may be achieved by employing a deicing composition comprising saccharinic acid, lignosulfonate and an alkali metal or alkaline earth metal chloride selected from among sodium chloride, magnesium chloride, calcium chloride and mixtures thereof, the ratio of said saccharinic acid, lignosulfonte and chloride being from 0.05:0.95:15 to 0.75:2.25:1. The composition has a pH value of from about 5.0 to 9.5. The saccharinic acid contemplated for use in the composition is isosaccharinic or metasaccharinic acid, or mixtures thereof. The saccharinic acid is conveniently derived from the alkali treatment of monosacchrides and oligosaccharides at a temperature of 50° C. to 150° C., and preferably at 80° C. to 100° C.

The mixture of saccharinic acid, lignosulfonate and metal chloride at the specified proportions is an effective substitute for sodium and calcium chloride salts used in the deicing of pavement. It has superior penetration power, and is readily adaptable to being used in combination with mechanical ice-removal operations.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
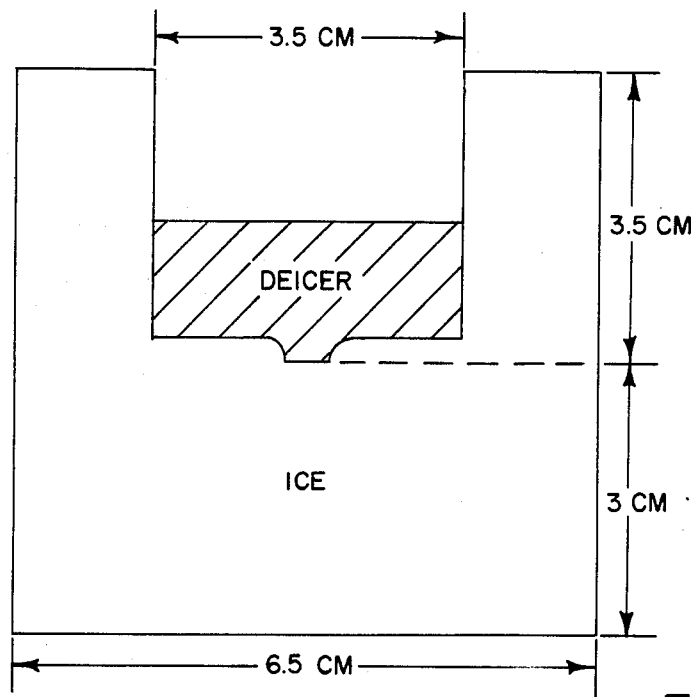
FIG. 1 is a schematic illustration of a cylindrical ice cube arrangement for testing the penetrating power of a deicer composition.

In accordance with a preferred embodiment of the invention, an effective deicing chemical composition of low corrosivity is prepared by mixing a saccharinic acid, a lignosulfonate and an alkali metal or alkaline earth metal chloride salt. According to a specific embodiment of the invention, the composition should be devoid of monosaccharides (sugars) and oligosaccharides having reducing end groups. Based on another embodiment of the invention, the composition contains a saccharinic acid, a lignosulfonate and a metal chloride, or a mixture of metal chlorides in amounts such that the ratio of the three components is from 0.05:0.95:15 to 0.75:2.25:1, respectively. These ratios provide for an effective lower limit as well as an upper limit beyond which the benefits of the combination are lost. The saccharinic acid includes isosaccharinic acid and metasaccharinic acid.

Saccharinic acid may be produced by alkali treatment of carbohydrates from such sources as corn stalks, straw, bagasse and the like, or wood sugars from hydrolysis with mineral acids. Alternatively, saccharinic acids may be derived directly from spent sulfite liquor which inherently contains monosaccharides and oligosaccharides by cooking the spent sulfite liquor with an alkali at a temperature of 50° C. to 150° C., preferably 80° C. to 100° C. Using either of the above methods, the alkali treatment readily reverts monosaccharides and oligosaccharides to isosaccharinic acid and metasaccharinic acid of the following formulae:

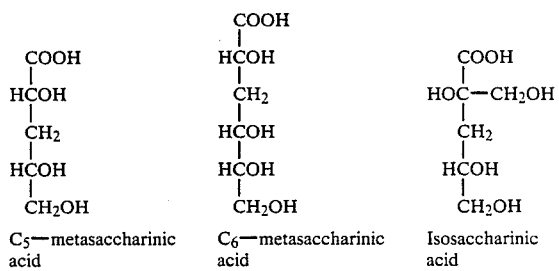

| COOH | COOH | COOH |
|---|---|---|
| HCOH | HCOH | HOC—CH$_2$OH |
| CH$_2$ | CH$_2$ | CH$_2$ |
| HCOH | HCOH | HCOH |
| CH$_2$OH | CH$_2$OH | CH$_2$OH |
| C$_5$—metasaccharinic acid | C$_6$—metasaccharinic acid | Isosaccharinic acid |

In the direct treatment of spent sulfite liquor carbohydrates with alkali, the amount of alkali (e.g., sodium or calcium hydroxide) has to be determined such that little residual alkali is left over at the end of the treatment and the pH of a treated liquor is somewhere between about 5 and 9.5, preferably between about 6 and 8. According to the method of the invention, the specific amount of hydroxide used, in the alkali treatment of spent sulfite liquor, for example, is determined according to the following equation:

$$W_a = W_{rs} \times 0.75$$

where
$W_a$=Quantity of hydroxide required as % by weight of spent sulfite liquor solids; and
$W_{rs}$=Quantity of reducing sugars as % by weight of spent sulfite liquor solids.

Sugar reversion, i.e. the process of reverting monosaccharides to saccharinic acids, and alkaline hydrolysis of carbohydrates may be effected simply by heating spent sulfite liquor at a solids concentration of about 20% to 60% with the specific amount of alkali, at a temperature of about 50° C. to 150° C., preferably about 80° C. to 100° C. for a length of time varying from about 2 to 10 hours. Generally, less time is needed at a higher temperature.

The mixture of lignosulfonate and saccharinic acid obtained from alkali treatment of spent sulfite liquor is blended with an alkali metal chloride or alkaline earth metal chloride at the ratio of between 1:15 and 3:1 to make the invention composition. Optionally, the saccharinic acid produced by alkali treatment of carbohydrates from corn stalks, straw, bagasse and the like, or wood sugars from hydrolysis with mineral acids, may be blended with a lignosulfonate and then that mixture blended with an alkali metal chloride or alkaline earth metal chloride to make the invention composition. The ratio of the three components, whether made by one or the other of the above two procedures, is from 0.05:0.95:15 to 0.75:2.25:1, respectively. The metal chlorides contemplated for the purpose of the invention include sodium chloride, calcium chloride, magnesium chloride and mixtures thereof. When a mixture of two or more metal chlorides is employed, the appropriate ratio of the chlorides chosen depends on the job requirement of deicing operations and may be determined by actual needs. However, it is generally recognized that magnesium chloride is more corrosive than either sodium chloride or calcium chloride, and can be used only as a minor component in a formulation. The increased corrosiveness due to employment of magnesium chloride in a deicing chemical formulation will have to be overcome by the addition of corrosion inhibitors (e.g., mixture of lignosulfonate and saccharinic acid).

As used herein, the term "Kraft lignin" has its normal connotation, and refers to the substance which is typically recovered from alkaline pulping black liquors, such as are produced in the Kraft, soda and other well known alkaline pulping operations. The term "sulfonated lignin", as used in the specification, refers to the product which is obtained by the introduction of sulfonic acid groups into the Kraft lignin molecule, as may be accomplished by reaction of the Kraft lignin with sulfite or bisulfite compounds, so that Kraft lignin is rendered soluble in water. As used herein, the term "sulfite lignin" refers to the reaction product of lignin which is inherently obtained during the sulfite pulping of wood, and is a principle constituent of spent sulfite liquor. The term "lignosulfonate" ($LSO_3$) encompasses not only the sulfite lignin, but also the sulfonated lignin herein above described. Any type of lignosulfonate i.e. hardwood, softwood, crude or pure may be employed to make the invention composition. Lignosulfonates are available from numerous sources, such as from Reed Lignin, Inc. under the trade designation "Lignosol".

Spent sulfite liquor is an ideal source of lignosulfonate in that it is readily available, it has a relatively low cost and is generally non-toxic. Spent sulfite liquor is a by-product of sulfite pulp mills in which wood or their plant materials are processed to separate the cellulose or pulp from the liquor. Such processes are, of course, well known. The principal ingredient of spent sulfite liquor as produced at the mill is lignosulfonate and is found generally to be present in amounts of from about 35% to about 70% or more by total dry weight with the remainder consisting of carbohydrates and other organic and inorganic compounds. For example, the following chemical composition is typical of spent sulfite liquor obtained from the pulping of softwoods and hardwoods (% by weight)

|  | Softwood | Hardwood |
| --- | --- | --- |
| Lignosulfonic acid | 55 | 42 |
| Hexose sugars | 14 | 5 |
| Pentose sugars | 6 | 20 |
| Non-cellulose carbohydrates | 8 | 11 |
| Acetic and formic acids | 4 | 9 |
| Resin and extractives | 2 | 1 |
| Ash | 10 | 10 |

In addition to the spent sulfite liquor as obtained from the sulfite pulping process (that is without substantial removal of other solids) spent sulfite liquors which have been subjected to a fermentation process to convert at least a portion of the carbohydrates to alcohol or to protein by-products (fermented spent sulfite liquor) or which have been subjected to alkali oxidation to produce vanillin (vanillin raffinate) are also contemplated for use in this invention as these liquors also contain sustantial amounts of lignosulfonate. However, if either of the latter two liquors are utilized, saccharinic acids must be produced separately and added to the lignosulfonate since the direct cooking method of producing saccharinic acid as noted previously herein would be ineffective to produce saccharinic acid as in both of these cases the sugars inherently found in the liquor have been destroyed during the fermentation and vanillin processes.

The spent sulfite liquor contains lignosulfonate as salts such as magnesium, calcium sodium, potassium or ammonium salts and the weight ratios referred to herein are with respect to the salt.

In operation, either a liquid or dried lignosulfonate/saccharinic acid mixture may be mixed with a solid or solution of metal chloride salt (with subsequent drying if appropriate) to provide liquid or solid mixtures contemplated by this invention. While, this invention contemplates the usual procedure of applying a mixture of the three ingredients to a surface, the invention also contemplates the separate application, either as a liquid or a solid, of each of the three ingredients to a road surface.

Since moisture is supplied by ice and snow, application of the lignosulfonate/saccharinic acid/metal chloride mixture to roads can be accomplished either in the liquid or the solid form. Most often, the mixture will be applied as solids in icing conditions. Such practice, however, does not foreclose the option of applying one or all of the ingredients in liquid form.

Since the ingredients are essentially in a physical mixture, any appropriate mixing device may be employed. Moreover, additional ingredients, such as a non-slipping agent, may also be added during the mixing. Conventional non-slipping agents include sand, limestone, cinder grit and the like.

When a non-slipping agent, such as sand, limestone, cinder grit and the like, is present, the mixture may be blended to provide an aqueous suspension of the non-slipping agent. Alternatively a dry mixture of the lignosulfoante, saccharinic acid and non-slipping agent may be prepared and stored until needed for use in conjunction with a metal chloride salt. The dry mixture can be prepared by simply mixing dry solids or by applying a lignosulfonate/saccharinic acid solution to the non-slipping agent and thereafter drying the mixture. Once again, the dried mixture can be applied to the surface separately or in admixture with the metal chloride salt and the ingredients can be applied in any desired combination of liquid and solid form.

The practice and advantages of this invention may clearly be seen in the following examples.

EXAMPLE ONE

A spent sulfite liquor, Norlig 41 available from Reed Lignin Inc., was used which contained (in percentages) 27.4 calcium lignosulfonate, 5.4 reducing sugars, 60 water, the remainder being inorganic salts, oligosaccharides and the like. The liquor (containing 100 parts of solids) was reacted with 10 parts of sodium hydroxide at a temperature of 95° C. for a period of 3 hours to substantially revert all of the sugars contained in the liquor to saccharinic acids. The reverted liquor had a pH of 8.5 and solids concentration of 39%, and contained calcium lignosulfonate and saccharinic acid in the ratio of approximately 5:1.

EXAMPLE TWO

The reverted spent sulfite liquor of Example ONE was blended with magnesium chloride to make a 20% solution of deicing formulation, in amounts such that the ratio (dry weight) of saccharinic acid:calcium lignosulfonate:magnesium chloride is 0.25:1.25:10. The pH of the mixture was 7.5.

EXAMPLE THREE

In a laboratory test designed to evaluate the corrosion inhibiting properties of the invention compositions and the prior art product of U.S. Pat. No. 4,668,416, namely, a lignosulfonate material available under the trade name of PCI (polymeric corrosion inhibitor) from Georgia-Pacific Corporation, mild steel coupons were alternately immersed in salt solutions (calcium chloride or sodium chloride) for 8 hours and exposed to air for 16 hours during a period of one month. The test results shown in Table 1 indicate that PCI, unmodified lignosulfonate, is less effective than the invention compositions as a corrosion inhibitor. PCI was formulated with magnesium chloride in amounts such that PCI/MgCl$_2$ is 6.7:1, equivalent to the ratio of Example TWO composition, herein.

TABLE 1

| Salt Solution | Inhibitor | Inhibitor Concentration (%) | Mild Steel Corrosion Rate (mils/year) |
|---|---|---|---|
| 3% NaCl | None | — | 18.6 |
| | Example ONE | 0.6 | 3.0 |
| | Example TWO | 0.6 | 9.8 |
| | Prior Art (PCI/MgCl$_2$) | 0.6 | 14.5 |
| 3% CaCl$_2$ | None | — | 17.6 |
| | Example ONE | 0.6 | 1.0 |
| | Example TWO | 0.6 | 2.0 |
| | Prior Art (PCI/MgCl$_2$) | 0.6 | 9.4 |
| Distilled Water | None | | 1.9 |

Note:
PCI is a lignosulfonate product of Georgia-Pacific Corporation.

EXAMPLE FOUR

Using the test of Example THREE, comparative data were obtained on a fermented spent sulfite liquor (Norling 92 available from Reed Lignin Inc.), an unmodified spent sulfite liquor (Norling 41 available from Reed Lignin Inc.) and an alkali treated Norling 41 (Example ONE). As shown in Table 2, the alkali treated apent sulfite liquor of Example ONE that contains about 15% saccharinic acids is significantly more effective in inhibiting corrosion than both the spent sulfite liquors (unmodified or fermented) employed in the prior art.

TABLE 2

Effect of saccharinic acids on corrosion rate of mild steel in 2.5% CaCl$_2$ or 2.5% NaCl solution.

| Salt Solution | Inhibitor Concentration (%) | Corrosion Rate (mils/year) |
|---|---|---|
| 2.5% CaCl$_2$ | 0.5% Norlig 92 | 13.1 |
| " | 0.5% Norlig 41 | 8.7 |
| " | 0.5% Example ONE | 2.2 |
| 2.5% NaCl | 0.5% Norlig 92 | 13.8 |
| " | 0.5% Norlig 41 | 12.3 |
| " | 0.5% Example ONE | 7.6 |

Note:
Corrosion test performed over a period of three months.

EXAMPLE FIVE

Figure 2:
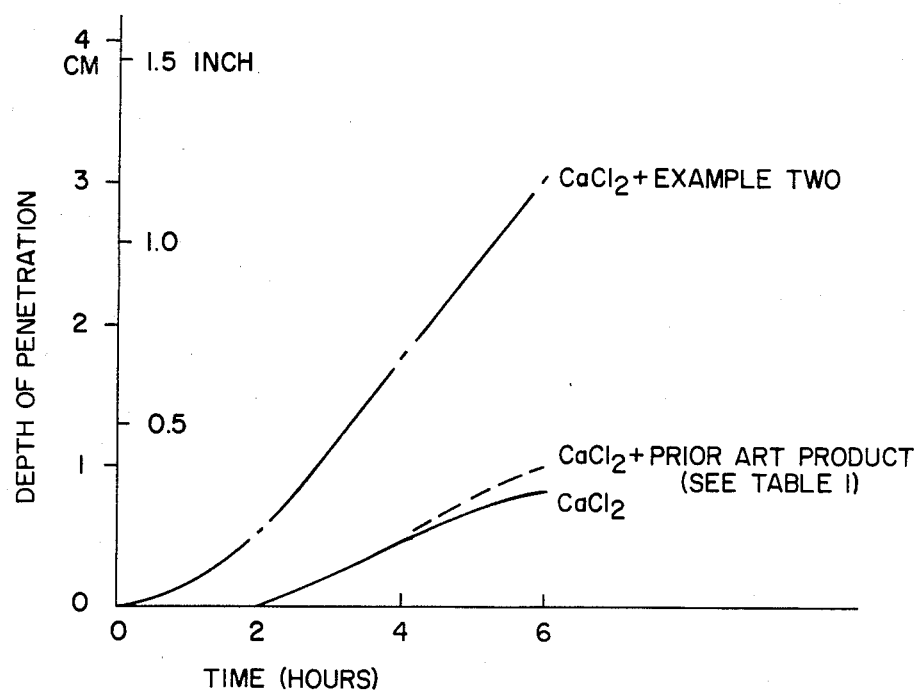
FIG. 2 is a graph of the depth of penetration versus time for various deicer compositions utilized in the test arrangement shown in FIG. 1.

This example demonstrates the penetrating power of the invention product in comparison with the product of U.S. Pat. No. 4,668,416. In this test, cylindrical ice cubes of 6.5 cm height and 6.5 cm diameter were prepared with a hole of 3.5 cm depth and 3.5 cm diameter drilled on the top center (see FIG. 1). A deicing salt solution (15 ml) of 20% concentration was poured into the hole and the depth of penetration (in centimeters) measured periodically. The results of the measurements are shown in FIG. 2 and indicate that the invention product is much superior to the prior art spent sulfite liquor product (PCI).

EXAMPLE SIX

To demonstrate the superior deicing power of the invention composition, a deicing experiment was conducted on Mar. 30, 1987 at Rothschild, Wisc. On the previous day, the area received a six-inch snow and a thermometer registered a subfreezing temperature during the course of testing. A snowplow had cleared a driveway leaving a hard ice-covered blacktop pavement. The thickness of the ice layer was approximately ⅜ inch. Three deicing formulations (50 milliliters) were applied uniformly each to a rectangular area of 16"×16" dimension at 10:15 AM with a spray bottle. At this time, the air temperature was registered at 24° F. At 11:15 AM, the air temperature climbed to 31° F. when the sprayed ice was broken and removed with a snow shovel.

The ice surface area in each rectangular plot was determined and percent deicing calculated as follows:

$$\% \ Deicing = [1 - (A_o - A_i)/A_o] \times 100$$

where
$A_o$=ice covered area before spraying of deicer formulation; and
$A_i$=ice covered area after deicing.

The results presented in Table 3 clearly show that the products of the invention are more effective deicing chemical compositions than the prior art product.

TABLE 3

Deicing efficiency of deicer formulation.

| Product | Description | Ice Covered Area (in²) After Deicing | % Deicing |
|---|---|---|---|
| Invention | A solution containing 4% sugar-reverted spent sulfite liquor solids of Example ONE and 20% CaCl₂ | 150.6 | 42 |
| Invention | A solution containing 4% mixture of sugar-reverted spent sulfite liquor solids and MgCl₂ (Example TWO) and 20% CaCl₂ | 71.9 | 72 |
| Prior Art* | A solution containing 4% mixture of fermented spent sulfite liquor and MgCl₂ and 20% CaCl₂ | 171.6 | 33 |
| None | Control | 256 | 0 |

*The weight ratio of fermented spent sulfite liquor solids and magnesium chloride is 1.5:10.

Various modes of carrying out the invention are contemplated as being within the scope of the following claims particularly pointing out and distinctly claiming the subject matter which is regarded as the invention.

I claim:

1. A deicing composition comprising a mixture of saccharinic acid, lignosulfonate and an alkali metal or alkaline earth metal chloride salt selected from the group consisting of sodium chloride, magnesium chloride, calcium chloride, and mixtures thereof, the ratio of said saccharinic acid, lignosulfonate and chloride being from about 0.05:0.95:15 to about 0.75:2.25:1.

2. The composition of claim 1 wherein said lignosulfonate is in the form of a sodium, calcium, magnesium, potassium or ammonium salt.

3. The composition of claim 1 wherein said saccharinic acid is isosaccharinic or metasaccharinic acid.

4. The composition of claim 1 wherein said saccharinic acid is derived from alkali treatment of corn stalks, molasses, bagasse or straw.

5. The composition of claim 1 wherein said saccharinic acid is derived from alkali treatment of sugars produced by saccharification of woody plants and other vegetation with mineral acids.

6. The composition of claim 1 wherein said saccharinic acid is derived from alkali treatment of wood sugars and oligosaccharides in spent sulfite liquor.

7. A process for deicing a road surface comprising the step of applying to said surface an effective amount of a deicing composition comprising a mixture of saccharinic acid, lignosulfonate and an alkali metal or alkaline earth metal chloride salt selected from the group consisting of sodium chloride, magnesium chloride, calcium chloride, and mixtures thereof, the ratio of said saccharinic acid, lignosulfonate and chloride being from about 0.05:0.95:15 to about 0.75:2.25:1.

8. The process of claim 7 wherein said mixture is applied in dry form.

9. The process of claim 7 wherein said mixture is applied in solution.

10. The process of claim 7 wherein said lignosulfonate is in the form of a sodium, calcium, magnesium, potassium or ammonium salt.

11. The process of claim 7 wherein said saccharinic acid is isosaccharinic or metasaccharinic acid.

12. The process of claim 7 wherein pH of the mixture is from about 5 to 9.5.

13. The process of claim 7 wherein said saccharinic acid is derived from alkali treatment of corn stalks, molasses, bagasse or straw.

14. The process of claim 7 wherein said saccharinic acid is derived from alkali treatment of sugars produced by saccharification of woody plants and other vegetation with mineral acids.

15. The process of claim 7 wherein said saccharinic acid is derived from alkali treatment of wood sugars and oligosaccharides in spent sulfite liquor.

* * * * *